(12) United States Patent
Xu et al.

(10) Patent No.: US 8,774,510 B2
(45) Date of Patent: Jul. 8, 2014

(54) TEMPLATE MATCHING WITH HISTOGRAM OF GRADIENT ORIENTATIONS

(75) Inventors: Xinyu Xu, Camas, WA (US); Petrus J. L. Van Beek, Camas, WA (US); Chang Yuan, Seattle, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 38 days.

(21) Appl. No.: 13/610,508

(22) Filed: Sep. 11, 2012

(65) Prior Publication Data

US 2014/0072217 A1  Mar. 13, 2014

(51) Int. Cl.
 *G06K 9/00* (2006.01)
(52) U.S. Cl.
 USPC .......................................... 382/170; 382/199
(58) Field of Classification Search
 USPC ......... 382/103, 168, 170, 199, 209, 216, 291, 382/305
 See application file for complete search history.

(56) References Cited

U.S. PATENT DOCUMENTS

| | | | |
|---|---|---|---|
| 6,363,160 B1 | 3/2002 | Bradski et al. | |
| 6,658,145 B1 | 12/2003 | Silver et al. | |
| 6,836,567 B1 | 12/2004 | Silver et al. | |
| 7,251,366 B1 | 7/2007 | Silver et al. | |
| 7,728,839 B2 | 6/2010 | Yang et al. | |
| 8,014,603 B2 | 9/2011 | Rodriguez Serrano et al. | |
| 8,131,066 B2 | 3/2012 | Hua et al. | |
| 8,131,074 B2 | 3/2012 | Owechko | |
| 8,509,478 B2 * | 8/2013 | Haas et al. | 382/100 |
| 2008/0025568 A1 * | 1/2008 | Han et al. | 382/103 |
| 2010/0034476 A1 | 2/2010 | Kido | |
| 2010/0034484 A1 | 2/2010 | Kido | |
| 2010/0098338 A1 | 4/2010 | Kido | |
| 2010/0098339 A1 | 4/2010 | Kido | |
| 2012/0027252 A1 | 2/2012 | Liu et al. | |

OTHER PUBLICATIONS

S. Hinterstoisser et al., "Dominant Orientation Templates for Real-Time Detection of Texture-Less Objects," IEEE Conf. on Computer Vision and Pattern Recognition (CVPR 2010), Jun. 2010, San Francisco, CA, 8 pgs.

F.Y. Shih and Y.-T. Wu, "Fast Euclidean distance transformation in two scans using a 3×3 neighborhood," Computer Vision and Image Understanding, vol. 93, 2004, pp. 195-205, 11 pgs.

S. Rusinkiewicz, M. Levoy, "Efficient variants of the ICP algorithm," Third International Conference on 3D Digital Imaging and Modeling, 2001, 8 pgs.

* cited by examiner

*Primary Examiner* — Phuoc Tran

(74) *Attorney, Agent, or Firm* — Chernoff Vilhauer McClung & Stenzel, LLP

(57) ABSTRACT

A system for image processing includes determining edge pixels of a model image using an edge based technique and determining an angular orientation for each the edge pixels of the model image. The system determines a histogram of gradient orientations based upon the angular orientations of the model image. The system determining edge pixels of an input image using an edge based technique and determining an angular orientation for each of the edge pixels of the input image. The system determines a histogram of gradient orientations based upon the angular orientations of the input image. The system compares the histogram of gradient orientations of the model image with the histogram of gradient orientations of the input image to determine candidate locations of an object within the input image.

17 Claims, 18 Drawing Sheets

TEMPLATE MATCHING

| INDEX | ANGULAR RANGE | BIT PATTERN |
|---|---|---|
| 0 | NON-EDGE | 00000000 |
| 1 | -15 to +15 | 00000010 |
| 2 | +15 to +45 | 00000100 |
| 3 | +45 to +75 | 00001000 |
| 4 | +75 to +105 | 00010000 |
| 5 | +105 to +135 | 00100000 |
| 6 | +135 to +165 | 01000000 |
| 7 | NOT USED | 00000000 |

FIG. 8

| INDEX | ANGULAR RANGE | BIT PATTERN |
| --- | --- | --- |
| 0 | NON-EDGE | 00000000 |
| 1 | -15 to +15 | 01000110 |
| 2 | +15 to +45 | 00001110 |
| 3 | +45 to +75 | 00011100 |
| 4 | +75 to +105 | 00111000 |
| 5 | +105 to +135 | 01110000 |
| 6 | +135 to +165 | 01100010 |
| 7 | NOT USED | 00000000 |

FIG. 9

0 DEGREE TEMPLATE

30 DEGREE TEMPLATE

60 DEGREE TEMPLATE

90 DEGREE TEMPLATE

120 DEGREE TEMPLATE

150 DEGREE TEMPLATE

PERFORM COARSE ANGLE SEARCH WITH
HISTOGRAM OF GRADIENT ORIENTATIONS       500

PERFORM SECOND ANGLE SEARCH AROUND
COARSE SELECTION Θ

PERFORM SECOND ANGLE SEARCH
AROUND Θ+Δ1+180

BEST ANGLE BY SECOND SEARCH
Θ+Δ1+180+Δ2

TEMPLATE MATCHING WITH HISTOGRAM OF GRADIENT ORIENTATIONS

CROSS-REFERENCE TO RELATED APPLICATIONS

None.

BACKGROUND OF THE INVENTION

The present invention relates generally to template matching for an image.

Referring to FIG. 1, template matching is a commonly used technique in order to recognize content in an image. The template matching technique includes a given target object in a model image, automatically finding the position, orientation, and scaling of the target object in input images. Generally, the input images undergo geometric transforms (rotation, zoom, etc) and photometric changes (brightness/contrast changes, blur, noise, etc). In the context of template matching, the relevant characteristics of the target object in the model image may be assumed to be known before the template matching to the target image is performed. Such characteristics of the target object may be extracted, modeled, and learned previously in a manner that may be considered "off-line," while the matching of those characteristics to the input image may be considered "on-line."

One of the template matching techniques includes feature point based template matching which achieves good matching accuracy. Feature point based template matching extracts object discriminative interesting points and features from the model and the input images. Then those features are matched between the model image and the input image with K-nearest neighbor search or some feature point classification technique. Next a homography transformation is estimated from those matched feature points, which may further be refined.

Feature point based template matching works well when objects contain a sufficient number of interesting feature points. It typically fails to produce a valid homography when the target object in the input or model image contains few or no interesting points (e.g. corners), or the target object is very simple (e.g. target object consists of only edges, like paper clip) or symmetric, or the target object contains repetitive patterns (e.g. machine screw). In these situations, too many ambiguous matches prevents generating a valid homography. To reduce the likelihood of such failure, global information of the object such as edges, contours, or shape may be utilized instead of merely relying on local features.

Another category of template matching is to search the target object by sliding a window of the reference template in a pixel-by-pixel manner, and computing the degree of similarity between them, where the similarity metric is commonly given by correlation or normalized cross correlation. Pixel-by-pixel template matching is very time-consuming and computationally expensive. For an input image of size N×N and the model image of size W×W, the computational complexity is $O(W^2 \times N^2)$, given that the object orientation in both the input and model image is coincident. When searching for an object with arbitrary orientation, one technique is to do template matching with the model image rotated in every possible orientation, which makes the matching scheme far more computationally expensive. To reduce the computation time, coarse-to-fine, multi-resolution template matching may be used.

What is desired therefore is a computationally efficient edge based matching technique.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 8 illustrates a bit pattern for different angles.

FIG. 9 illustrates another bit pattern for different angles.

DETAILED DESCRIPTION OF PREFERRED EMBODIMENT

Figure 1:
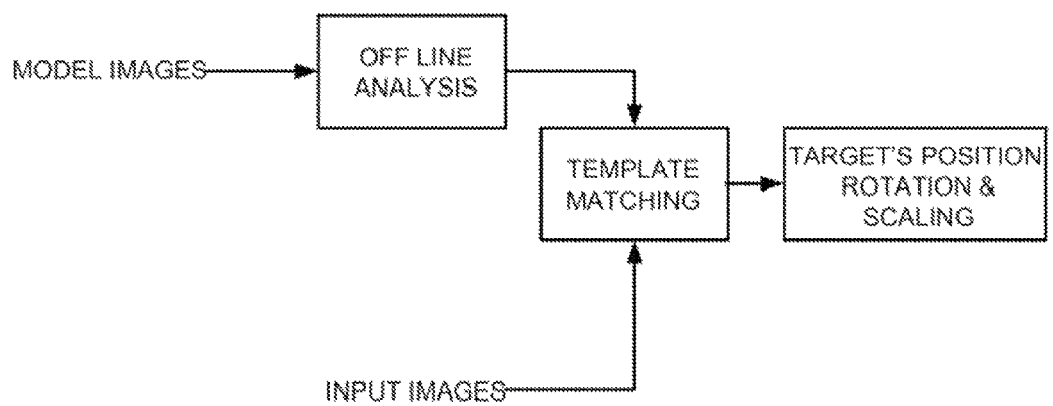
FIG. 1 illustrates template matching.
Figure 2:
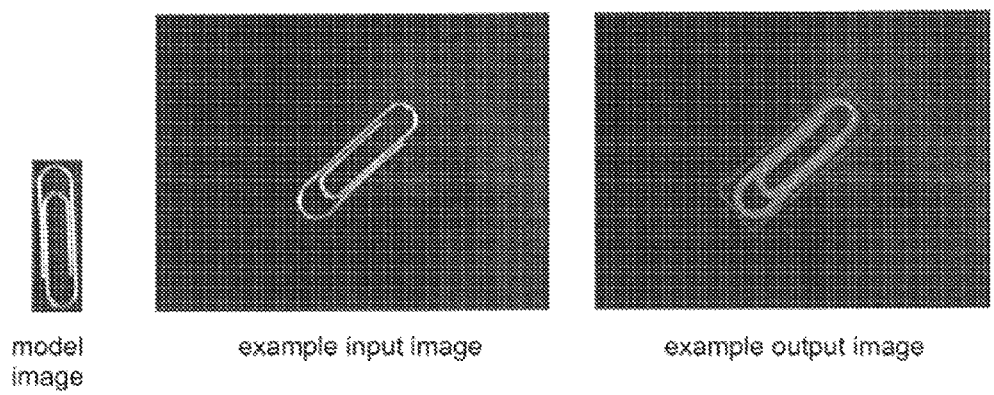
FIG. 2 illustrates a model image, an input image, and an output image.

Referring to FIG. 2, in many cases a model image has a limited set of feature points but tends to have relatively sharp edge features. One such example is a paperclip. Then using a suitable matching technique it is desirable to find a matching object in one or more input images, in a computationally efficient manner. The matching object may be at an unknown position and at an unknown rotation.

Figure 3:
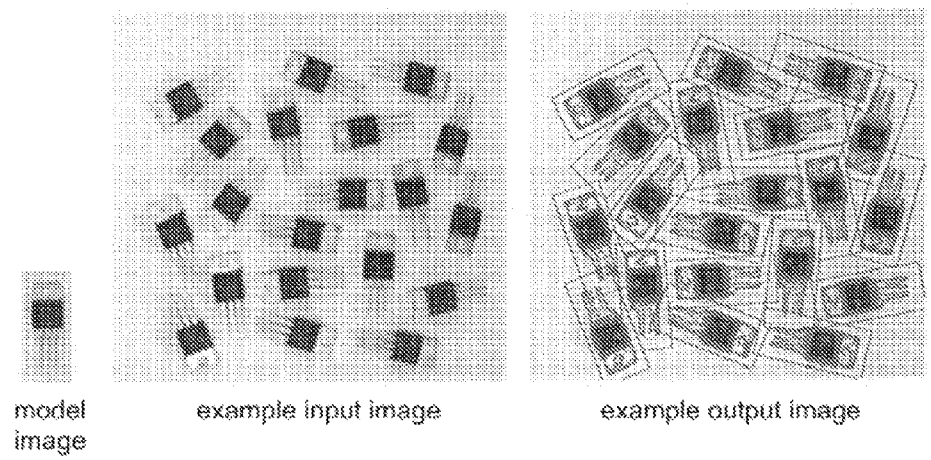
FIG. 3 illustrates another model image, an input image, and an output image.

Referring to FIG. 3, in many cases the input image may have one or more matching objects of interest, which may be overlapping with one another. Then using a suitable matching technique it is desirable to find matching objects in one or more input images, in a computationally efficient manner. The matching objects may be at an unknown position and at an unknown rotation.

Figure 4:
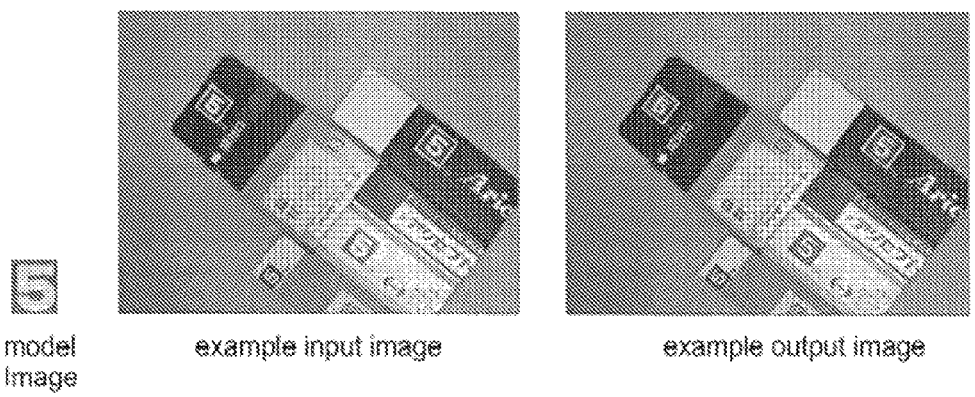
FIG. 4 illustrates another model image, an input image, and an output image.

Referring to FIG. 4, in many cases the input image may have one or more matching objects of interest, which may be overlapping with one another. Then using a suitable matching technique it is desirable to find matching objects in one or more input images, in a computationally efficient manner. The matching object may be at an unknown position, unknown rotation, and unknown scale.

Referring again to FIG. 2, FIG. 3, and FIG. 4, the matching technique should be computationally efficient, while being sufficiently robust to distinguish image features such as sharp corners, significant edges, or distinguish images with relatively few such features. Moreover, the matching technique should be sufficiently robust to reduce effects due to lighting or illumination changes in the image, blur in the image, noise in the image, and other imaging imperfections.

Figure 5:
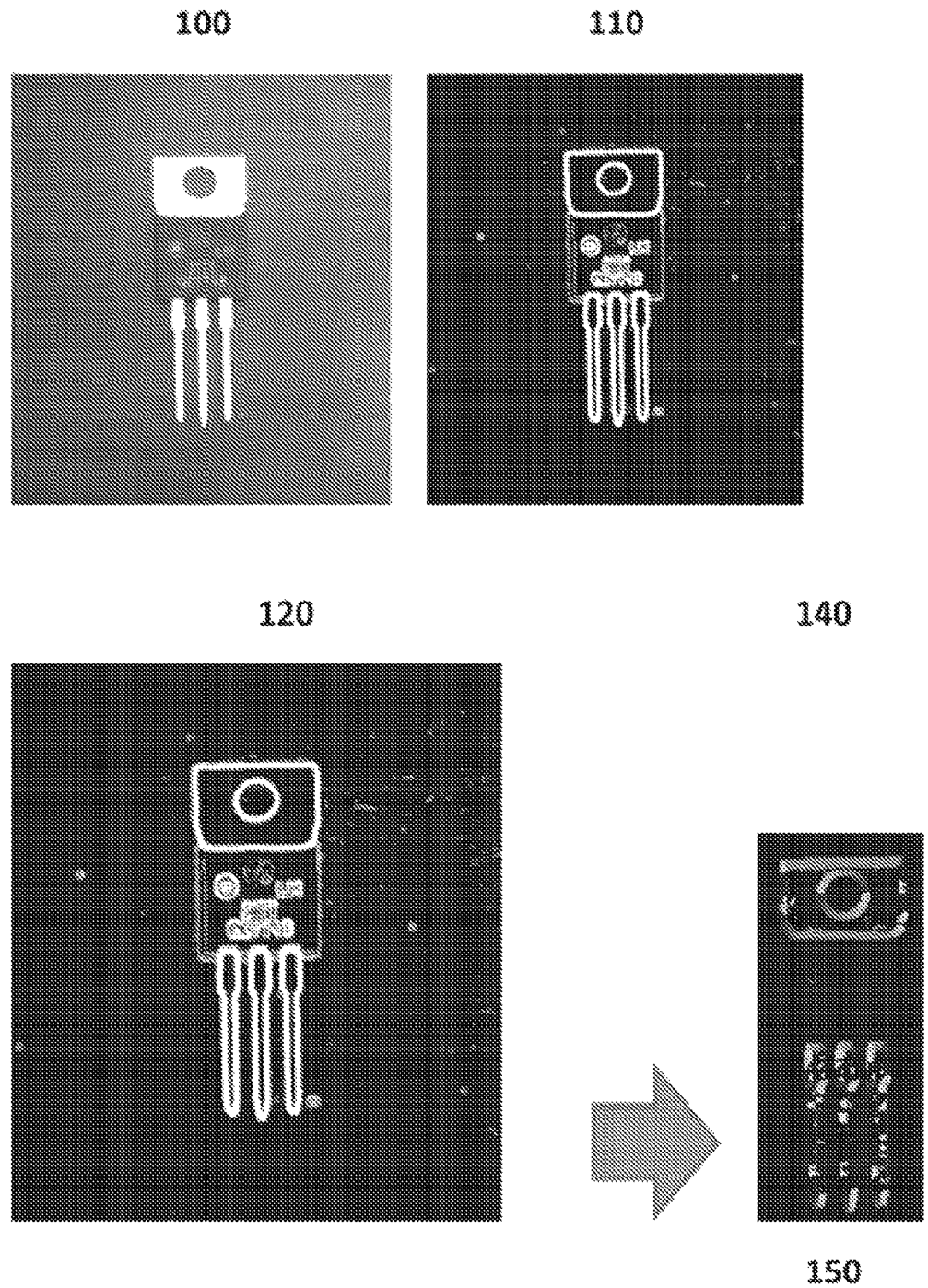
FIG. 5 illustrates an image matching technique.

Referring to FIG. 5, a model image 100 may be received by the system. A preferred technique to determine regions of the model image 100 that are likely to be of interest for image matching is to use an edge based technique 110 to locate edges of the model image. For example, one way to determine the edges 110 is to use a gradient based technique. Edge based techniques are generally robust, generally invariant to lighting changes, generally invariant to illumination changes, generally noise resistant, and generally may be implemented in a computationally efficient manner. For each of the pixels determined to be an edge pixel, the orientation of the edge 120 may be determined. For example, the orientation 120 at each edge pixel may be determined to have an orientation from 0 to 17.9 degrees (e.g., less than 360 degrees), such as in one degree increments. The orientation may be a full 360 degrees, if desired. The edge orientation 120 therefore preferably includes information regarding the alignment of the edge, but not its particular direction. To increase the invariance of the technique, the edge orientation 120 is preferably defined in a range of generally 180 degrees (e.g., less than 360 degrees). In this manner, the direction of an edge may be either in one direction (e.g., north) or the opposite direction (e.g., south), but the system is agnostic as to which particular direction. This manner of edge orientation characterization results in a system that is more invariant to contrast inversions.

A pixel resolution template 140 may be determined based upon the edge orientations 120. The pixel resolution template 140 may have 180 degrees of angular information at one degree increments (or some other suitable angular increment) at each of the edge pixel locations. Processing input images based only upon the "high resolution" pixel resolution template is computationally inefficient due to the high angular resolution and the high spatial resolution of the pixel resolution template. To increase the computational efficiency of the system, one or more additional quantized angular templates and/or spatial templates based upon the pixel resolution template 140 are preferably utilized.

Figure 6:
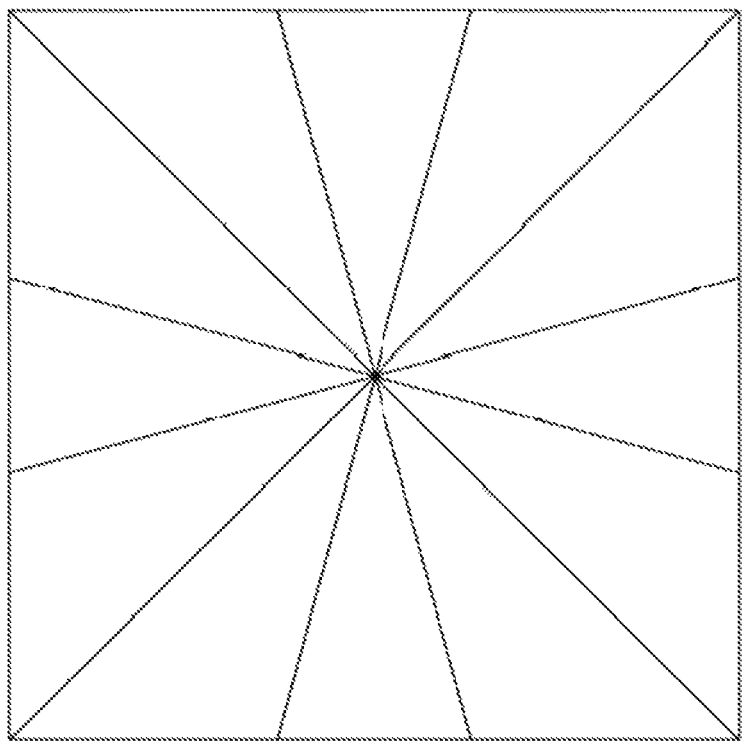
FIG. 6 illustrates a plurality of angular orientations.

Referring to FIG. 6, the edge orientations 120 may, if desired, be quantized, such as, for example, into one of a set of six orientations, such as −15 to +15 degrees, +15 to +45 degrees, +45 to +75 degrees, +75 to +105 degrees, +105 to +135 degrees, and +135 to +165 degrees. The other opposing six orientations may not need to be determined because the system is preferably directionally invariant. Accordingly, each pixel of the pixel template 140 may be categorized as being within one of the six orientations forming an overall lower angular resolution template 150.

Figure 7:
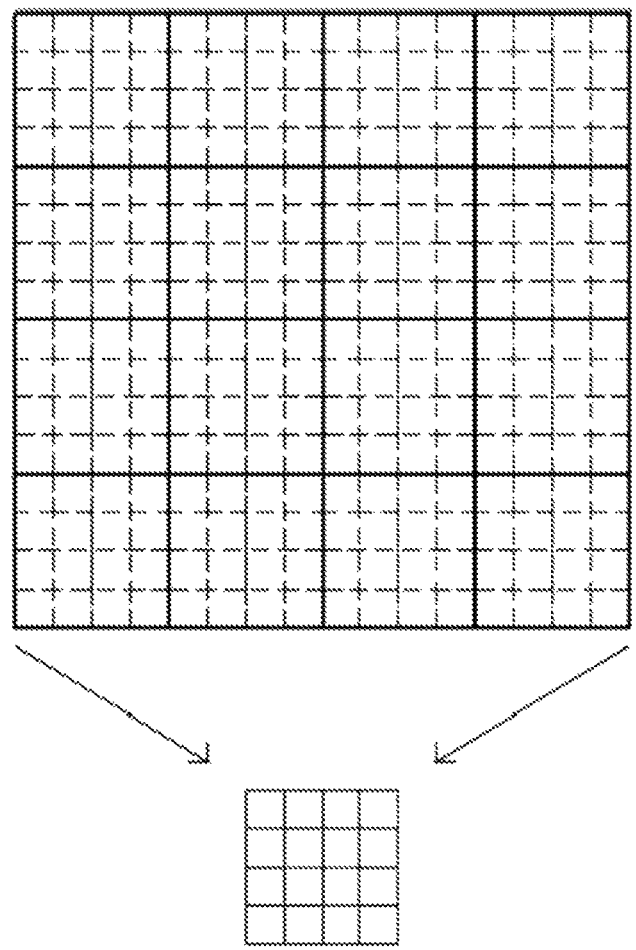
FIG. 7 illustrates pixel blocks of an image.

Referring to FIG. 7, to further increase the computational efficiency, if desired, of the system, a lower spatial resolution template based upon the lower angular resolution template 150 may be defined by combining groups of pixels, including their angular orientations, into a combined angular direction at a lower resolution. The lower angular resolution template 150 may be modified in a manner to provide lower spatial resolution. For example, each block of 4×4 pixels of the lower angular resolution template may be combined to indicate a single direction and/or multiple directions. For each block of pixels, the frequency of the occurrence of each orientation may be arranged in a rank order. As an alternative, the orientations of the pixels in a block may be arranged in a rank order based on their associated edge strength and/or gradient magnitude. Then the top four occurrences (or other suitable number) of the ranked orientations may be selected as those orientations representative of those in the block. For example, if there are four different orientations then each of them may be selected. For example, if there are three orientations that are the same and a fourth orientation that is different, then the representative orientations may be the two different orientations. Likewise, the edge strength and/or gradient magnitude may be used as a basis for ranking. Other than being used as a basis of ranking to select the orientations, the frequency of the orientations (number of pixels having the same quantized orientation) is preferably not represented in the lower spatial resolution template.

Referring to FIG. 8, to further increase the computational efficiency, if desired, the template may be encoded using a set of bytes, with bits of each byte being representative of an angular orientation. For example, the first bit may be representative of a first angular orientation of the six orientations. For example, the second bit may be representative of a second angular orientation of the six orientations. For example, the third bit may be representative of a third angular orientation of the six orientations. For example, the fourth bit may be representative of a fourth angular orientation of the six orientations. For example, the fifth bit may be representative of a fifth angular orientation of the six orientations. For example, the sixth bit may be representative of a sixth angular orientation of the six orientations. As previously noted, the angular orientations are preferably offset from horizontal and vertical, such as −15 degrees to +15 degrees, +15 degrees to +45 degrees, +45 degrees to +75 degrees, +75 degrees to +105 degrees, +105 degrees to +135 degrees, and +135 degrees to +165 degrees. Often the angular orientation of the object within the input image tends to have either vertical and/or horizontal edges, and generally centering those horizontal and/or vertical angular relationships within a range of angles (e.g., −15 to +15) tends to make the system more robust to slight angular modifications. With the potential angular relationships of groups of pixels being represented by bytes, the system can perform computationally efficient pattern matching.

Referring to FIG. 9, in some cases it is desirable to include more robustness in the orientation of the angular determination for a particular pixel to reduce the effects of compared angles being on opposing sides of the quantized angular boundaries. For example, the model image may have an angle of 44 degree (bit pattern 00000100). However, the input image may have a local orientation angle of the same part of the object that was 46 degrees due to noise or other small changes. Then the angle of the input image would be quantized and given a bit pattern of 00001000. The angle codes would not match one another, even though there was only a very small difference in the orientation angle. In such cases with minor variations in the angle, the orientation of the angular determination between an input image and a model template may appear to be significant, while possibly only being different by a couple of degrees (e.g., 44 degrees and 46 degrees). To reduce this likelihood, the bit patterns of the model template may be broadened to include adjoining angular regions. Accordingly, if the bit pattern of the model image was modified to include both sides of the quantized region, namely, 00001110, then the pixel region of the input image having a bit pattern of 00001000 would have overlap and thus be matched. In this manner, the matching would be more robust, although slightly less discriminative. This approach may be refined and extended using additional bit patterns. In particular, a bit pattern may be broadened on only one side of the quantized region, instead of both sides. Furthermore, the decision to broaden a bit pattern may be based on the proximity of the actual orientation angle to the quantization boundary.

Figure 10:
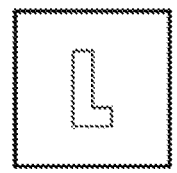
FIG. 10 illustrates a plurality of templates at different rotations.
Figure 10:
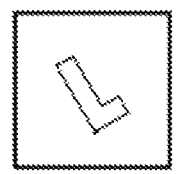
Figure 10:
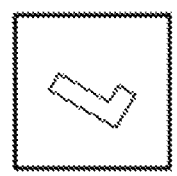
Figure 10:
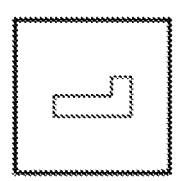
Figure 10:
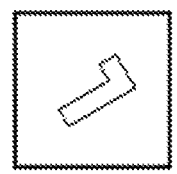
Figure 10:
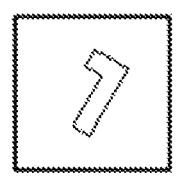

Referring to FIG. 10, to increase the computational efficiency, if desired, of the system for input images that have objects therein that are at different angular orientations, the model image may be rotated to a plurality of different orientations. The templates are computed at each of the different angular orientations. In this manner, each of the templates for a particular model image may be pre-computed in an efficient manner. For example, the angular positions may include 0 degrees, 30 degrees, 60 degrees, 90 degrees, 120 degrees, and/or 150 degrees. In this manner, an input image to the system to be processed may be compared against a variety of pre-computed lower spatial resolution templates, and in particular, angularly quantized low resolution templates.

Figure 11:
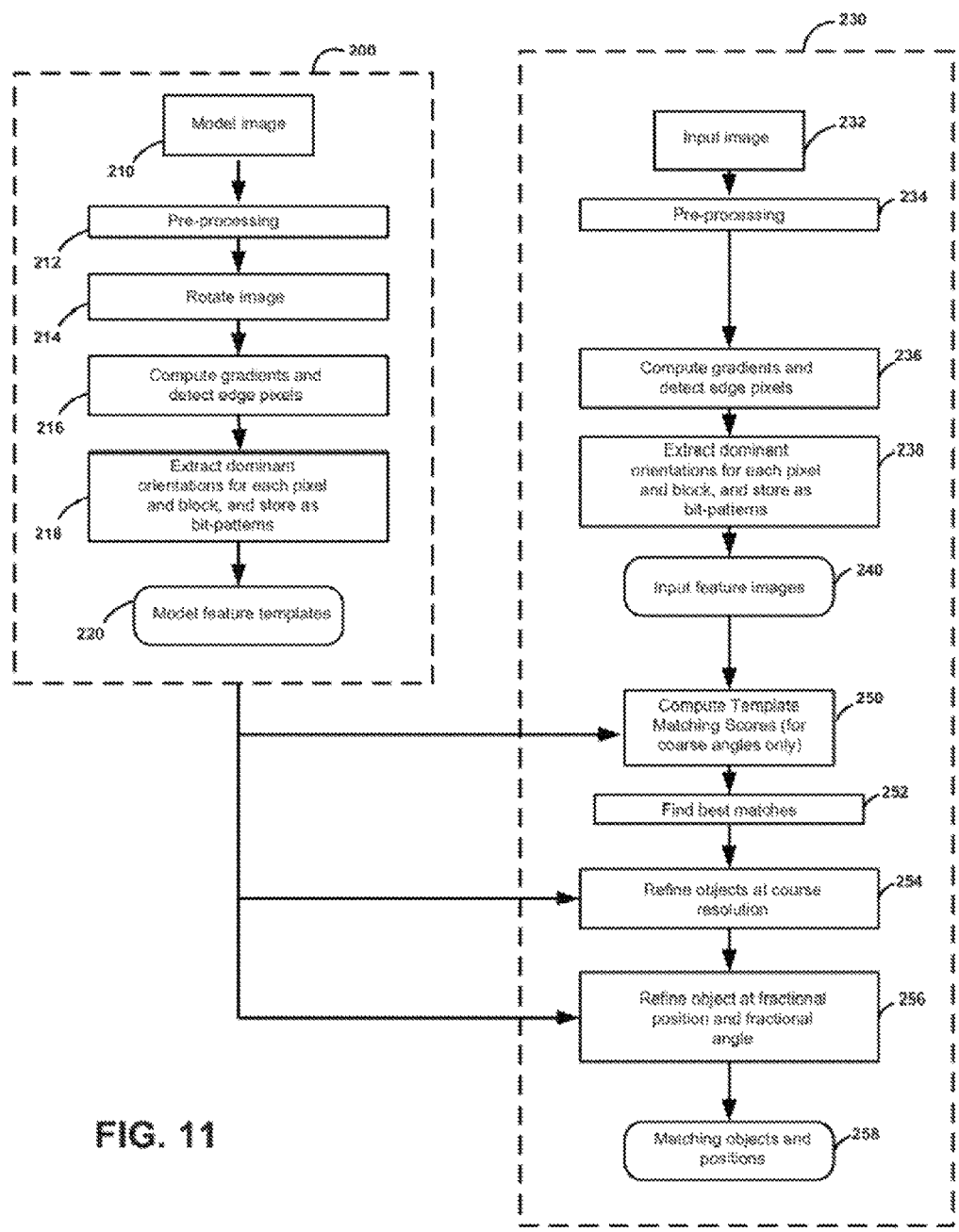
FIG. 11 illustrates an image processing technique for matching.

Referring to FIG. 11, an exemplary model process 200 for a model image 210 and the input image process 230 are shown. The model image 210 may be pre-processed 212 to reduce noise in the image, such as using a low pass filtering operation. The filtered model image 212 may be rotated among a set of orientations, such as by 30 degrees, by a rotation module 214. For each of the set of orientations 214 the system may compute the gradients to identify the edges within the image and determine those pixels of the image corresponding with the edges 216. For each of the set of orientations for which the edges are determined 216, the system may extract the orientations for each pixel and the dominant orientations for blocks of pixels (such as a 4×4 blocks of pixels) and store the result as a set of bytes having suitable bit patterns 218, as previously discussed. In addition, the system may generate a set of full resolution templates at substantially finer angular resolutions, such as rotations of one degree. The result of this process is a set of model feature templates 220.

The exemplary input image process 230 for an input image 232 may include being pre-processed 234 to reduce noise in the image. The system may compute the gradients to identify the edges within the filtered input image and determine those pixels of the image corresponding with the edges 236. For each of the edges that are determined 236, the system may extract 238 the orientations for each pixel and the dominant orientations for blocks of pixels (such as a 4×4 blocks of pixels) and store the result as a set of bytes having suitable bit patterns 240, as previously discussed. The system may likewise compute a full resolution input feature images. The result of this process is input feature images 240.

The system may compute template matching scores 250 between the input feature images 240 and each of the coarse rotations of the model feature templates 220 for different regions of the input image 232. These comparison templates are preferably based upon the byte representation of the respective images, if desired, as previously discussed. For example, the system may process the templates centered at each pixel or block of pixels of the input image or otherwise in any other suitable manner. A set of matches 252, preferably those with the highest scores, between the input feature images and the template is determined in any suitable manner.

The result of the matches 252 provides initial candidate locations in the input image that are likely to include an object of interest and also provide rough angular orientations of the objects of interest. The system then refines 254 the angular orientation of each of the objects of interest in the input image by using the course resolution model image at its finer angular resolutions to determine a finer angular estimation. In addition, the system may refine 254 the spatial location of each of the objects of interest in the input image by using the coarse resolution model image at its finer angular resolution. The input feature images may use a higher resolution and/or finer angular resolution, if desired. A set of refined matches between the input feature images and the template is determined in a suitable manner.

The use of a two-stage matching process is computationally more efficient than a one-stage process. The first stage provides a rough estimation of the location of potential objects of interest in the input image, in an efficient manner. The second stage provides a finer estimation of the location of the identified potential objects of interest in the input image, in an efficient manner, by reducing the area of the search and the angular range of the search.

The result of the matching refinement 254 may be provided to a fractional refinement process 256. The fractional refinement process 256 may include an angular search and/or a spatial search using the "full resolution" model image. Also, the fractional refinement process 256 may refine the angular orientation of the objects of interest in the input image by using the "full resolution" model image at angles interpolated in some manner between its finer angular resolutions to determine a fractional angular estimation. In addition, the fractional refinement process 256 may refine the spatial location of the objects of interest in the input image by using the "full resolution" model image at its finer angular resolution and/or fractional angle at positions interpolated in some manner. The input feature images may use a higher resolution and/or finer angular resolution template, if desired. A set of further refined matches 258 is determined in a suitable manner.

The use of a three-stage matching process is computationally more efficient than a one-stage or two-stage process. The first stage provides a rough estimation of the location of potential objects of interest in the input image, in an efficient manner. The second stage provides a finer estimation of the location of the identified potential objects of interest in the input image, in an efficient manner, by reducing the angular range of the search. The third stage provides a reduced spatial and/or angular search together with a sub-angular and/or sub-pixel resolution which provides a finer estimation of the location of the identified potential objects of interest in the input image, in an efficient manner.

A more computationally efficient technique for finding object location and orientation is to break down the matching into two steps: the first step is to quickly find the coarse object orientation by matching the Histogram of Gradient Orientation (HoGO) of model image with the Histogram of Gradient Orientation (HoGO) of input patch; the second step is to find object location with the aforementioned edge-based matching technique. In matching model HoGO with input HoGO, only one model template is matched to input, eliminating the need of rotating model feature template several times and matching these several rotated models to the input. As a result, great time saving is achieved with this HoGO feature. After the coarse orientation is found at each pixel by HoGO matching, the coarse object position is then computed with the aforementioned edge-based template matching technique using the model of particular angle obtained by HoGO matching at each pixel.

The characterization of an image includes using a histogram of gradient orientations, which may be considered a version of an edge determination. For local regions of the image the gradient orientations of local portions of the image are determined. In general, descriptors based upon the histogram of gradient orientations provide a description of image content, such as the appearance and shape of an object within the image. For example, the descriptors may be obtained by dividing the image into smaller connected regions and for each region determining a histogram of gradient orientations. The collection of histograms represents the corresponding descriptor. For improved accuracy, the local histograms may be contrast normalized by determining a measure of the intensity across a larger region of the image. In many cases, such a descriptor tends to be generally invariant to geometric and photometric transformations.

Figure 12:
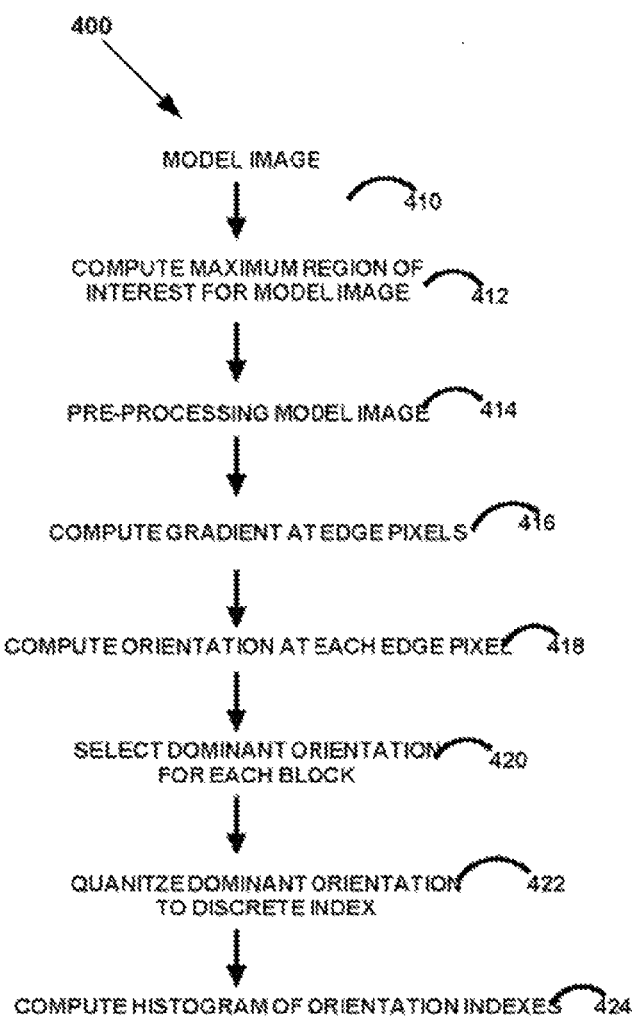
FIG. 12 illustrates a determination of histogram of gradient orientation.
Figure 12:
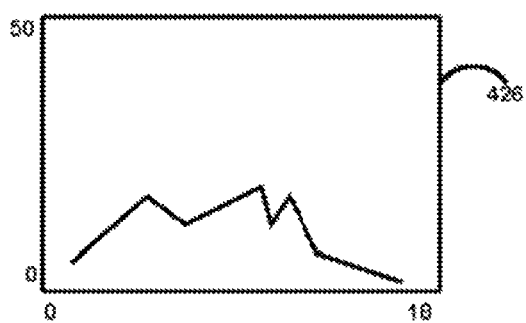

Referring to FIG. 12, a modified model image process 400 is illustrated. The model image is received 410 and a maximum region of interest of a rotated model image may be determined 412 by rotation of the model image, such as in 1 degree increments. The overall maximum region of all of the rotated model images may be selected. The rotation of the model increases the likelihood that the model image is fully encapsulated by the region of interest so that all the potential edge pixels are counted toward the histogram computation. For example, a rectangular model image may be rotated to determine all pixels that may be encompassed by the model image at any arbitrary angular rotation. A square bounding box around these pixels may be selected as the region of interest. In general, the region of interest is larger than the model image, except perhaps for a circular model image with a circular region of interest.

The region of interest 412 including the model image 410 may be pre-processed 414 to reduce the noise and/or down sample the model image including its region of interest. The model image process 400 may compute the gradient 416 for different parts of the image, such as the edge based regions of the image. For example, the gradient may be computed using a Sobel filter, Dx, Dy. The gradients that are less than a static and/or a dynamic threshold may be discarded, if desired. The orientation for each pixel 418 having a sufficiently large gradient magnitude may be determined, such as arctan(Dx/Dy).

The dominant orientation for each block of pixels 420 may be selected, such as the maximum gradient value within respective blocks. Typically, the orientation may be within a range of 180 degrees. Typically the dominant orientation 420 may be quantized to a discrete index 422. For example, the dominant orientation may be quantized within ranges of 10 degrees and mapped to a quantized index. The maximum gradient that is less than a static and/or a dynamic threshold may be discarded, or otherwise set to zero, if desired. As an example the following orientation quantization and quantized index may be used.

| Orientation | Quantization |
|---|---|
| <Threshold | 0 |
| [0 10] | 1 |
| [11 20] | 2 |
| [21 30] | 3 |
| [31 40] | 4 |
| [41 50] | 5 |
| [51 60] | 6 |
| [61 70] | 7 |
| [71 80] | 8 |
| [81 90] | 9 |
| [91 100] | 10 |
| [101 110] | 11 |
| [111 120] | 12 |
| [121 130] | 13 |
| [131 140] | 14 |
| [141 150] | 15 |
| [151 160] | 16 |
| [161 170] | 17 |
| [171 180] | 18 |

A histogram of the orientation indexes 424 is computed, which is graphically shown as a graph 426 for illustration purposes.

Figure 13:
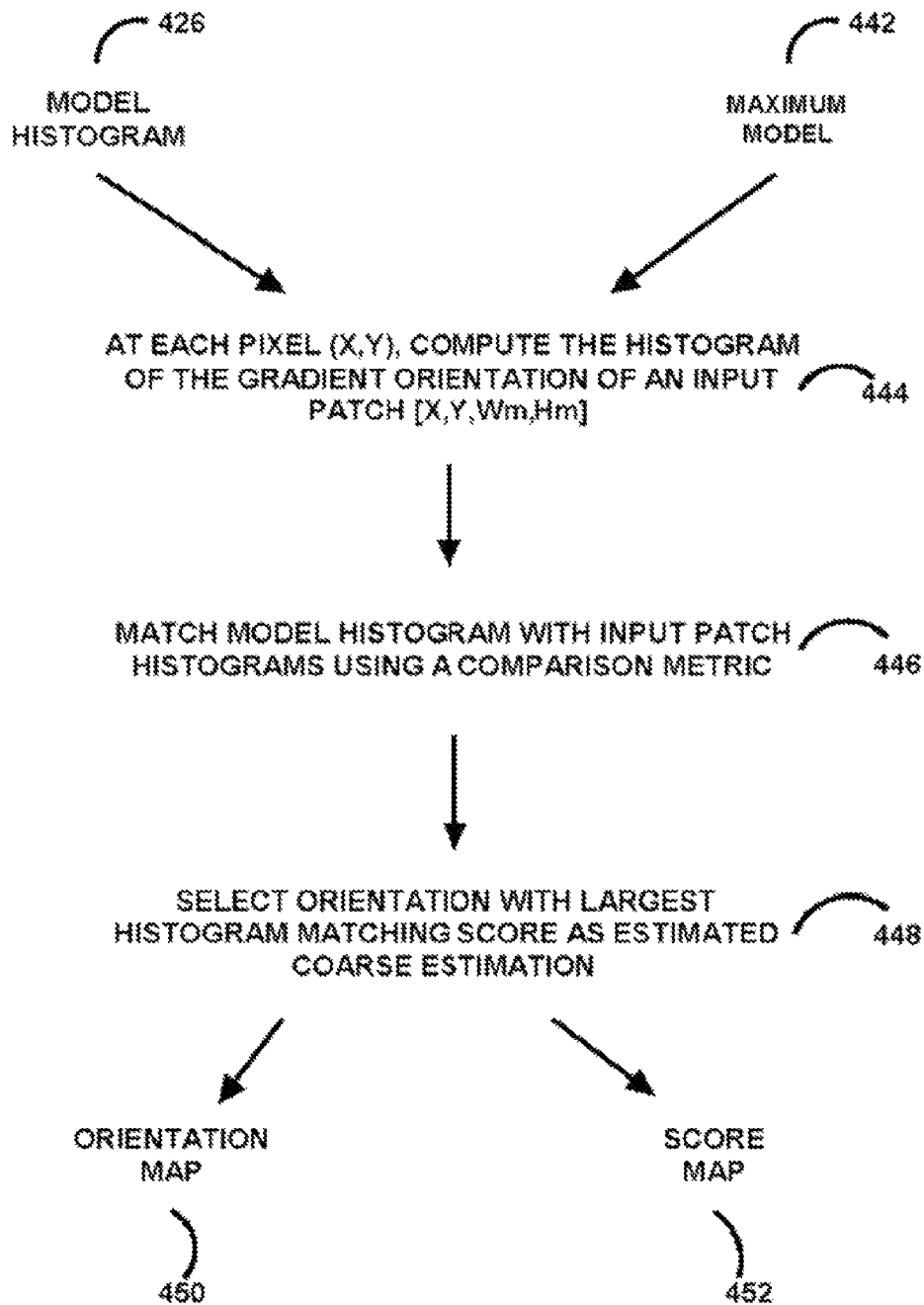
FIG. 13 illustrates a histogram comparison technique.

Referring to FIG. 13, with a histogram of the quantized orientation index at each pixel or block location, the system may determine the coarse object orientation of an input image. The inputs may include the model histogram 426, and the maximum model [Wm Hm] 442 indicating the size of the region of interest. At each pixel or block [x,y] the system computes the histogram of the gradient orientations (e.g., input patches) for input patch [x y Wm Hm] 444. In other words, the system computes a histogram at each pixel or block of the input image.

The model histogram 426 is matched with the input patch histograms 444 using a comparison metric 446. The comparison metric 446 may effectively do a comparison of the model histogram at each quantized angular orientation, such as at 18 different angular orientations, with the input patch histograms. One manner of performing such a comparison is to repeatedly shift one histogram relative to the other and do a comparison between the two at each shifted position. The orientation that has the largest histogram matching score is selected as an estimated coarse orientation 448. The result is an orientation map 450 and a score map 452. The orientation map 450 provides the orientation of all pixels, groups of pixels, or a selected set of pixels (e.g., such as those with corresponding with an edge) of the input image. The score map 452 provides the magnitude of all pixels, groups of pixels, or a selected set of pixels (e.g., such as those with corresponding with an edge) of the input image. In this manner, the orientation and magnitude of the pixels or groups of pixels is determined.

Any suitable histogram comparison metric may be used for matching, where H1 and H2 are the two histograms being compared. Examples of such techniques are as follows:

Cross correlation:

$$d_{correl}(H_1, H_2) = \frac{\sum_i H'_1(i) \square H'_2(i)}{\sqrt{\sum_i H'^2_1(i) \square H'^2_2(i)}}$$

$H'_k(i) = H_k(i) - (1/N)(\Sigma_j H_k(j))$, N is the number of bins in the histogram Chi-Square:

$$d_{chi-square}(H_1, H_2) = \sum_i \frac{(H_1(i) - H_2(i))^2}{H_1(i) + H_2(i)}$$

Intersection:

$$d_{intersection}(H_1, H_2) = \sum_i \min(H_1(i), H_2(i))$$

Bhattacharyya distance:

$$d_{Bhattacharyya}(H_1, H_2) = \sqrt{1 - \sum_i \frac{\sqrt{H_1(i) \square H_2(i)}}{\sqrt{\sum_i H_1(i) \square \sum_i H_2(i)}}}$$

Kullback-Leibler divergence:

$$d_{KL}(H_1, H_2) = \sum_i H_1(i) \ln \frac{H_1(i)}{H_2(i)}$$

When computing the histogram at each input patch position [x y], in order to inhibit the edge pixels of the neighborhood object from being included in computing the histogram of current object, the system may include a mask to exclude those neighborhood edge pixels. The radius of the mask may be computed as half of the maximum width and height of the model region of interest.

Figure 14:
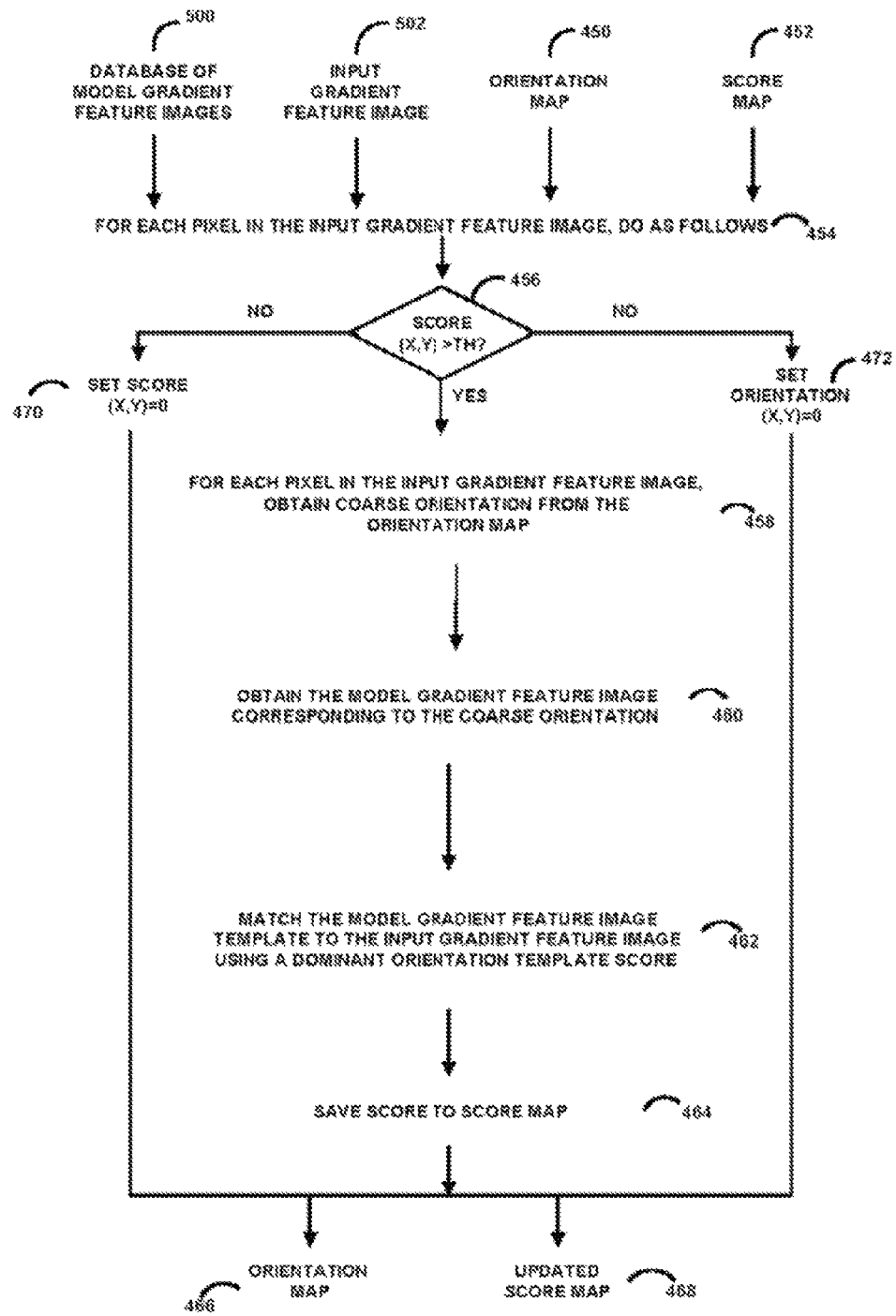
FIG. 14 illustrates a dominant orientation matching technique.

Referring to FIG. 14, the system may further refine the estimate of the object position and/or orientation within the input image from the coarse object determination process. The preferred technique to further refine the object position is based upon a dominant orientation template, such as previously described. The inputs may include a database of model gradient features 500 such as for every 10 degrees, an input gradient feature (GF) image 502, the orientation map 450, and the score map 452. The model gradient feature image 500 may include the binary codes at each detected edge pixel, as previously discussed. The input gradient feature (GF) image 502 includes the binary codes at each detected edge pixel, as previously described.

For each pixel or block in the input gradient feature image a process is performed 454. The system determines if the score (x,y) from the score map 452 at each pixel or block is greater than a threshold 456. If so, then for each pixel in the input gradient feature image 502, the process obtains the coarse orientation from the orientation map 458. The process also obtains the corresponding model gradient feature template 500 to the coarse orientation 460. The process matches the corresponding model gradient feature template to the input gradient feature image 502 at each location 462 using a dominant orientation template score. The resulting score is saved to a score map 464. If the score (x,y) is less than a threshold, then the score (x,y) is set to zero 470 and the orientation (x,y) is set to zero 472. The result is an updated orientation map 466 and an updated score map 468 that is further refined.

Figure 15:
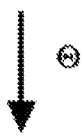
FIG. 15 illustrates an angular determination technique.
Figure 15:
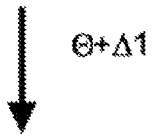
Figure 15:
Figure 16:
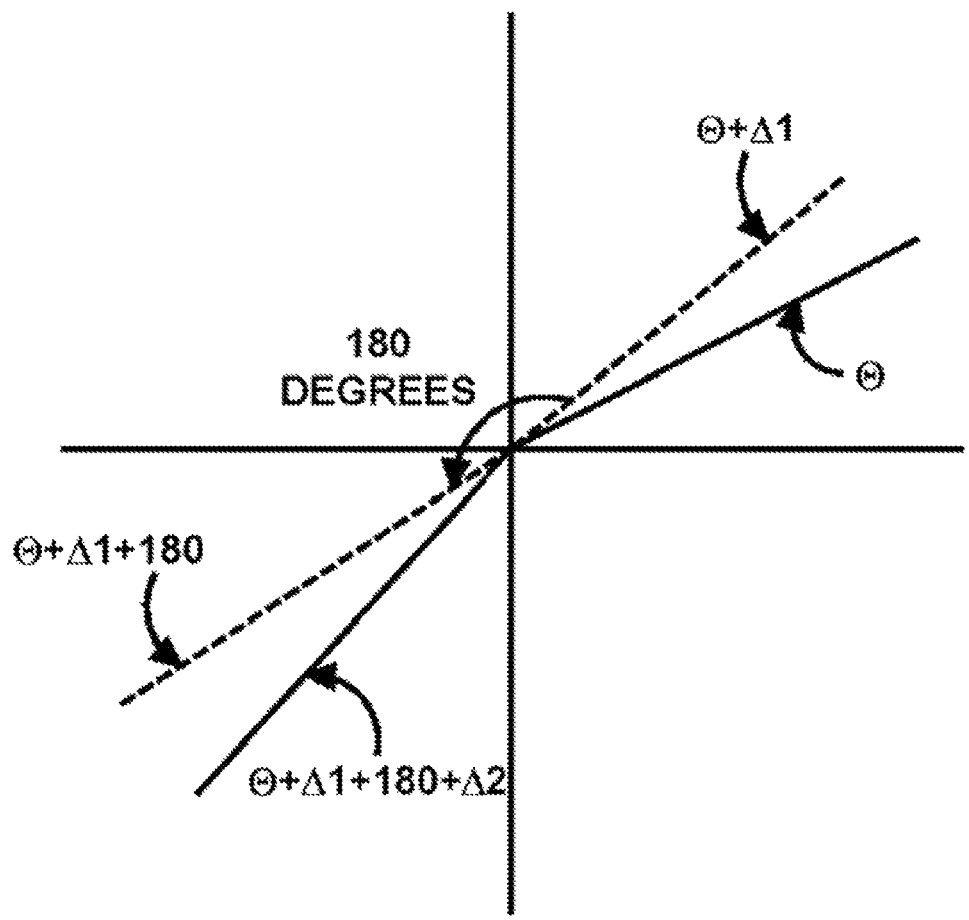
FIG. 16 illustrates the angular determination technique.

Referring to FIGS. 15 and 16, the histogram of an object is the same as the histogram of the same object that is rotated 180 degrees, therefore the orientation estimated by histogram matching technique is in the range of [0 180] degrees, which results in ambiguity of the estimated orientations, that is, the histogram cannot distinguish an object and the same object that is 180-degree rotated. To resolve the orientation ambiguity, the system may compute a coarse rotation angle (whose range is from 0 to 180 degree) with the histogram of gradient orientations. Next, the initial coarse angle is refined as a result of a second search stage by matching in a small neighborhood. Then, the second search is repeated by searching in a small neighborhood around an angle that is offset by 180 degrees from the previously refined angle. The best angle from the two second searches is selected as the correct object angle, which may subsequently be further refined in another search stage. This strategy resolves orientation estimation ambiguity and improves orientation estimation accuracy and efficiency since the two second searches are performed in a small spatial neighborhood.

The complexity of computing the histogram at each input patch is O(r), where r is the radius of the region of interest of the model template, or kernel radius. High complexity hampers the ability to use such a histogram based technique for a real time application with limited computational capabilities. With the desire to process larger images together with a corresponding larger model object, there is a desire for more efficient histogram computation. A much more efficient histogram computation technique exhibiting O(1) complexity is achieved.

Figure 17:
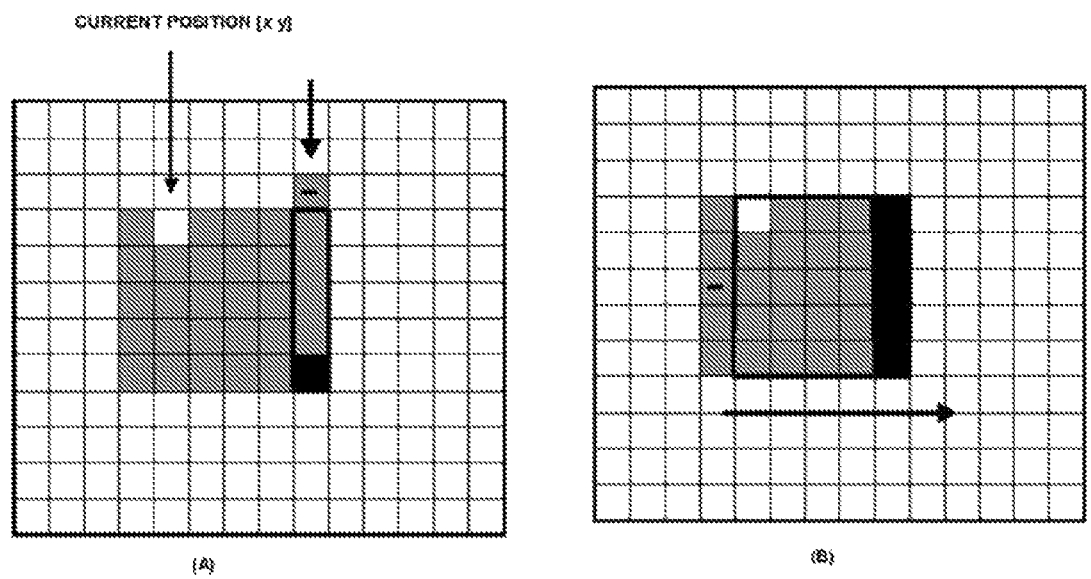
FIG. 17 illustrates a histogram computation technique.

Referring to FIG. 17, the preferred histogram computation technique maintains one histogram for each column in the image. This set of histograms is preserved across rows for, preferably the entirety, of the process. Each column histogram accumulates 2r+1 adjacent pixels and is initially centered on the first row of the image. The kernel histogram is computed by summing 2r+1 adjacent column histograms. Thus, the technique may break up the kernel histogram into the union of its columns, each of which maintains its own histogram. While computing the histogram for the entire input image, all histograms may be kept up to date in constant time with a two-step approach.

For example, consider the case of moving to the right from one pixel to the next. The column histograms to the right of the kernel are yet to be processed for the current row, so they are centered one row above. The first step consists of updating the column histogram to the right of the kernel by subtracting its topmost pixel and adding one new pixel below it. The effect of this is lowering the column histogram by one row. This first step is O(1) since only one addition and one subtraction, independent of the filter radius, is carried out. The second step moves the kernel histogram, which is the sum of 2r+1 column histograms, one pixel to the right. This is accomplished by subtracting its leftmost column histogram and adding the column histogram lowered in the first step. This second step is also O(1). The net effect is that the kernel histogram moves to the right while the column histograms move downward. Each pixel is visited only once and is added to only a single histogram. All of the per-pixel operations (updating both the column and kernel histograms) are O(1).

Initialization consists of accumulating the first r rows in the column histograms and computing the kernel histogram from the first r column histograms. This results in an O(r) initialization. In addition, there is overhead when moving from one row to another which accounts for another O(r) term. However, since the O(r) initialization only occurs once per row, the cost per pixel is insignificant for arbitrarily large images. In particular, the cost drops to substantially O(1) per pixel when the dimensions of the image are proportional to the kernel radius, or if the image is processed in tiles of dimensions O(r).

By way of example, the number of operations of a basic, non-optimized histogram generation technique is M×M, where M=kernel height (or width). For a fast O(1) technique, the Number of Operations (NO) is different for different pixels:

if y=0,x=0 NO=0, use the initial kernel histogram.

If y=0, x>0, NO=B histogram additions+B histogram subtractions=2*B, B is the number of histogram bins.

If y>0, x=0, NO=M histogram increment+M histogram decrement+kernel updating=2*M+B*M, where M is kernel height (or width).

If y>0, x>0, NO=1 addition+1 subtraction+B additions+B subtractions=2+2*B.

The memory usage of fast O(1) histogram generation technique may be the memory of column histograms+the memory of kernel histogram=M*B*16+B*16, where M is the model width, B is the number of bins, and 16 is the bit depth for the histogram.

With the proposed fast O(1) histogram generation technique, the coarse orientation estimation algorithm may be changed to the following (technique illustrated in Pseudo code):

---

Input: Image X of size m×n, model histogram M, kernel width wt, kernel height ht
Output: Score map MS of the same size, angle map MR of the same size
    Initialize kernel histogram H and column histogram $h_{0...n-1}$
    For y=0 to m−1 do:
        For x=0 to n−1 do:
            Remove $X_{y-1,x+wt-1}$ from $h_{x+wt-1}$.

-continued

> Add $X_{y+ht-1,x+wt-1}$ to $h_{w+wt-1}$.
> Update kernel histogram $H \leftarrow H + h_{x+wt-1} - h_{x-1}$.
> Match input histogram H to model histogram M with a histogram comparison metric.
> Record highest score MS and the corresponding angle to MR.
> End for.
> End for.

In some situations, streaming SIMD extensions (SSE) may be used to add and/or subtract histograms by processing multiple bins in parallel. For example, one SSE instruction may be used to add or subtract multiple histogram bins. Also, if desired, the system may process the column histograms for a whole row of pixels before processing the kernel histograms. Further, using SSE extensions the system may update multiple column histograms in parallel.

One technique for object matching and localization is by extracting gradient orientation templates from an object image and matching the templates in the input images. An improved refinement of the initial location and orientation (e.g., pose) may be determined by searching within a range around an initial location and orientation. As previously described, template matching techniques can determine potential locations for an object, but for multi-object and/or multi-scale processes it is time consuming and requires significant computational resources. Thus, an alternative technique to template matching is desirable. Preferably, the histogram of oriented gradients technique is employed for coarse matching, then a non-template matching based technique is used to obtain improved position and orientation. By using a suitable transformation based technique an exhaustive search may be avoided, especially by using data resulting from the histogram based technique.

Figure 18:
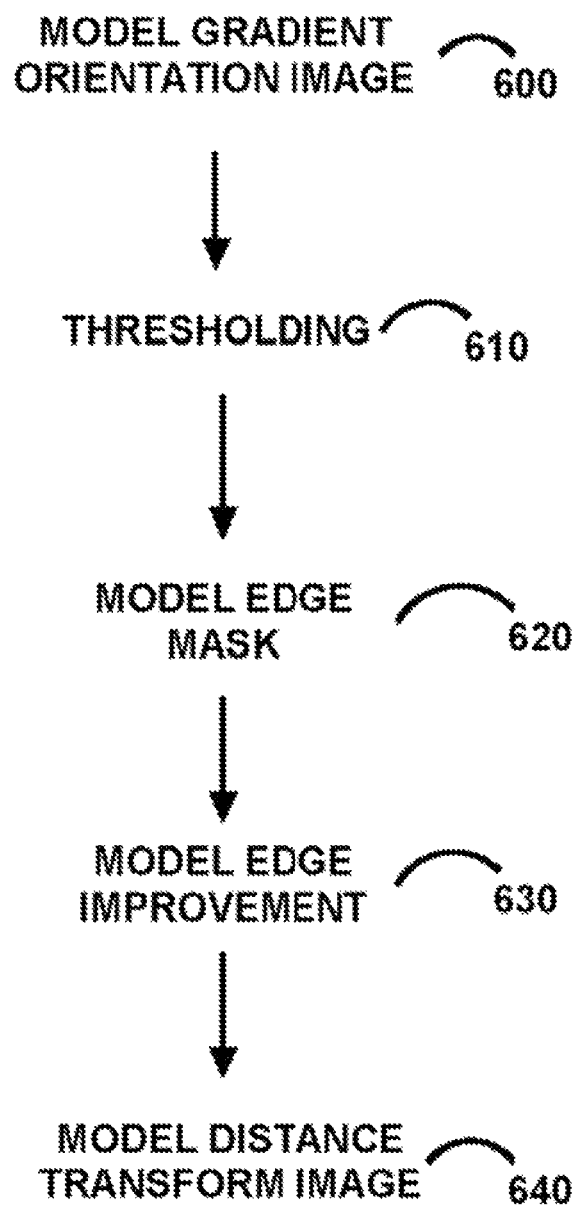
FIG. 18 illustrates a model edge technique.
Figure 19:
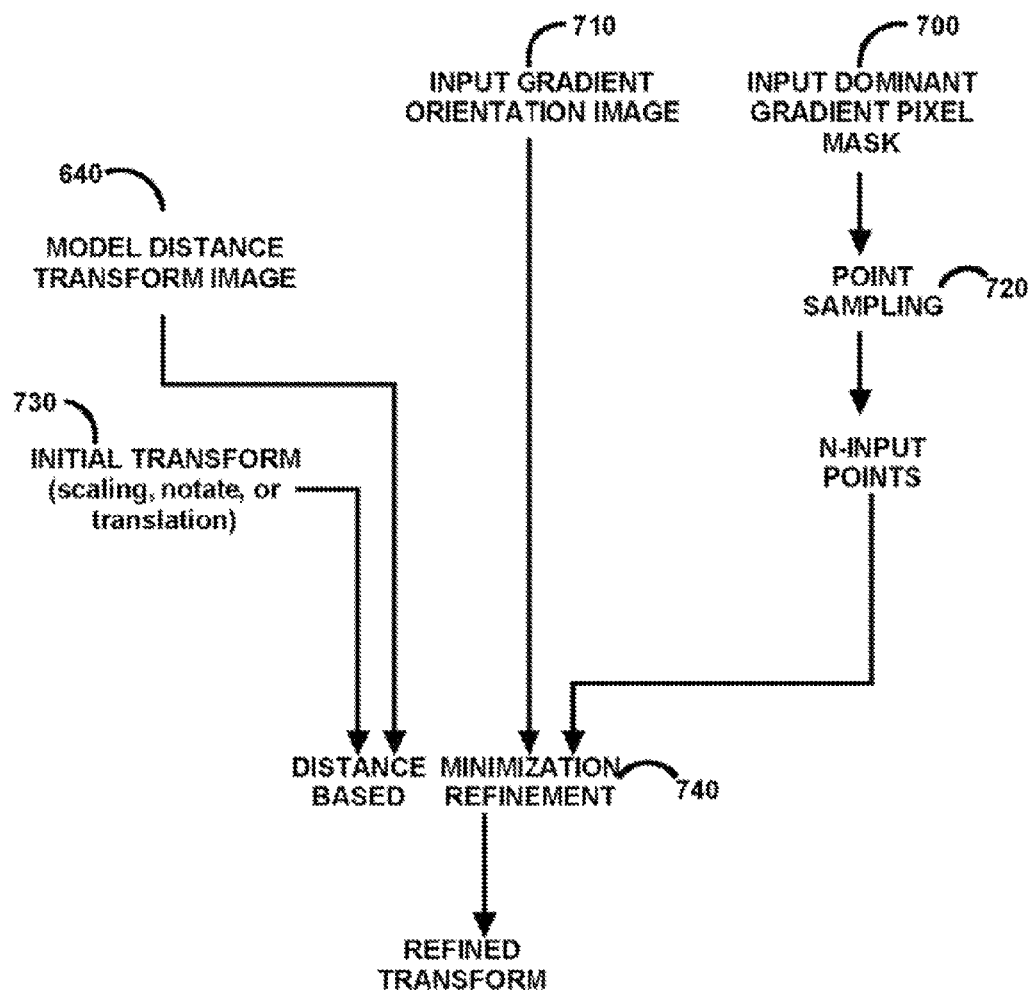
FIG. 19 illustrates a distance minimization based refinement.

Referring to FIG. 18, an improved matching technique may be used for matching object shapes in input images given the object shape in a model image. An initial estimate of the object pose, i.e. position and rotation, in the input image is provided as a result of the coarse object matching technique, such as previously described. The estimation of the object's pose may be refined by minimizing (e.g., reducing) the distances between model edge pixels and input edge pixels.

The model image, including the region of interest if desired, may be processed to determine edge pixels and/or regions together with the magnitude of such edges of the model image, such as using gradient orientations 600. A thresholding technique 610 may be applied to the model edge pixels to remove those that are unlikely to be associated with an edge. The result of the thresholding 610 is a model edge mask 620. Typically, the model edge pixels are somewhat cluttered due to edge discontinuity. The model edge mask 620 may be further improved by using a model edge improvement technique 630, such as a Canny technique, to estimate the edges based upon their direction. Another edge model edge improvement technique 630 is to fit local edge pixels into short edgelets and/or contours, so that isolated edge pixels or those pixels outside the true object contours are reduced or otherwise removed. Another model edge improvement technique 630 is to select representative model edge pixels with a sufficiently strong magnitude, such as those that are at least a percentage of the maximum gradient magnitude and/or a number of edge pixels with the strongest gradient magnitudes. The result of the model edge improvement technique 630 is provided to a model distance transform image process 640. The model distance transform may be a transform that computes the closest distance to non-zero pixels in a binary mask image, such as $D(x,y)=\|(x,y)-(x0,y0)\|$ where (x0,y0) is the closest non-zero pixels in the binary mask image. A vector distance transform may be applied to compute the two-dimensional offset (dx,dy) for each pixel, such as: $(dx,dy)=(x-x0,y-y0)$ where (x0, y0) is the closest non-zero pixel. The two-dimensional offset contains the information for finding the closest non-zero neighbor.

Referring to FIG. 18, a transform refinement process is illustrated. Not every input point needs to be selected for the edge distance minimization process as there exists background clutter in the input edge mask image. One technique to select the input points of the input image is to identify the pixels with dominant gradient magnitudes 700, as part of the gradient feature matching process, previously described. Another technique is to use the edge pixels with sufficiently large gradient magnitudes 710. Preferably the number of input points is limited, such as, by a point sampling process 720 to reduce the computational requirements of the system. A transform 730 may be applied to the initial input points of the input image input points. The original matching result may be translated into a two-dimensional rigid transform represented as rotation (theta) and transform in the x and y directions (tx and ty). The transform moves the original two dimensions points to a new position, such as follows:

$$\begin{bmatrix} x' \\ y' \\ 1 \end{bmatrix} = \begin{bmatrix} \cos\theta & -\sin\theta & t_x \\ \sin\theta & \cos\theta & t_y \\ 0 & 0 & 1 \end{bmatrix} \begin{bmatrix} x \\ y \\ 1 \end{bmatrix}.$$

A corresponding model edge pixel for each input edge pixel may be used to compute an updated transform 740. In this manner, the distance transform image 640 may be used to determine the correspondence in a more computationally efficient manner. Given the input edge pixel (x,y), the two dimensional offset at this pixel (dx,dy), and the corresponding model pixel is (x+dx,y+dy). A threshold may be selected such that only the close correspondences are maintained as valid point correspondences. In other words, if |dx|>threshold or |dy|>threshold, this correspondence is labeled as not used. Before computing a revised transform, a cost and error function may be used for evaluating whether the revised transform is an improved result.

An exemplary cost function may be as follows:

$$\operatorname{argmin}_{S,R,T} \Sigma_{i=1}^{K} \epsilon(\lambda(SRp_{input}^{i}+T-p_{model}^{i})+(1-\lambda)(\theta_{input}^{i}-\theta_{model}^{i})^2)^2,$$

Where S is scale, R is rotation, T is translation, the first term is a position error, the second term is an orientation angle error, P input is the input image, and P model is the input model. Also, a robust distance metric $\epsilon(\bullet)$ (e.g., truncated exponential function) may be applied to reduce the influence of outlier points.

One technique to compute the revised transform is to compute the numerical derivative of the cost function in the parameter space (theta, tx, ty) and then compute the transform update vector based on the derivatives (Jacobian matrix). For example, a Levenberg-Marquardt method may be used for multiple iterations. Another technique to compute an improved transform is least squares fitting. The result of least squares fitting may be determined analytically. The least squares fitting technique may determine an improved transform directly.

The proposed method depends on a small number of edge pixel pairs and can lead to very high speed, while retaining accuracy. To this end, the method includes a stage to select a reduced number of input points. Selection may be based on local gradient features.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for image processing comprising:
   (a) determining edge pixels of a model image using an edge based technique;
   (b) determining an angular orientation for each said edge pixels of said model image;
   (c) determining a histogram of gradient orientations based upon said angular orientations of said model image;
   (d) determining edge pixels of an input image using an edge based technique;
   (e) determining an angular orientation for each of said edge pixels of said input image;
   (f) determining a histogram of gradient orientations based upon said angular orientations of said input image;
   (g) comparing said histogram of gradient orientations of said model image with said histogram of gradient orientations of said input image to determine candidate locations of an object and candidate orientations of said object within said input image, wherein said candidate orientations as a result of said comparing discriminate between candidate orientations that are offset by 180 degrees.

2. The method of claim 1 wherein each of said edge based techniques includes a gradient.

3. The method of claim 1 wherein said angular orientation of said edge pixels of said model image is defined in a range less than 360 degrees.

4. The method of claim 3 wherein said range is generally 180 degrees.

5. The method of claim 1 wherein said histogram of gradient orientations of said model image is based upon combining groups of pixels of said model image.

6. The method of claim 5 wherein said histogram of gradient orientations of said input image is based upon combining groups of pixels of said input image.

7. The method of claim 1 wherein said comparison is based upon a region of interest having a size greater than the boundaries of an object in said model image.

8. The method of claim 1 wherein said angular orientation for each of said edge pixels of said input image is quantized.

9. The method of claim 1 wherein said angular orientation for each of said edge pixels of said model image is quantized.

10. The method of claim 1 wherein said comparing said histogram of gradient orientations of said model image with said histogram of gradient orientations of said input image to determine candidate locations of said object within said input image is based upon a plurality of different relationships of said histograms.

11. The method of claim 1 wherein said candidate locations is further refined based upon another technique.

12. The method of claim 11 wherein said another technique is based upon template matching.

13. The method of claim 1 wherein said comparing is further processed for angular discrimination.

14. The method of claim 1 wherein said determining a histogram is based upon a complexity of substantially O(1) pixel operations.

15. The method of claim 14 wherein said comparing includes the use of streaming SIMD extensions.

16. The method of claim 1 wherein said edge pixels of said model image is further modified based upon an edge mask.

17. The method of claim 1 wherein said comparing is further modified based upon an edge distance reduction process.

* * * * *